(12) United States Patent
Zhang et al.

(10) Patent No.: US 10,341,136 B2
(45) Date of Patent: Jul. 2, 2019

(54) METHOD FOR MANAGING CONFIGURATION OF INDUSTRIAL INTERNET FIELD BROADBAND BUS

(71) Applicant: KYLAND TECHNOLOGY CO., LTD., Beijing (CN)

(72) Inventors: Jianfeng Zhang, Beijing (CN); Zhiwei Yan, Beijing (CN)

(73) Assignee: KYLAND TECHNOLOGY CO., LTD., Beijing (CN)

( * ) Notice: Subject to any disclaimer, the term of this patent is extended or adjusted under 35 U.S.C. 154(b) by 101 days.

(21) Appl. No.: 15/264,237

(22) Filed: Sep. 13, 2016

(65) Prior Publication Data

US 2017/0373880 A1 Dec. 28, 2017

(30) Foreign Application Priority Data

Jun. 23, 2016 (CN) .......................... 2016 1 0466728

(51) Int. Cl.
*H04L 12/40* (2006.01)
*G06F 13/42* (2006.01)
*H04L 12/28* (2006.01)

(52) U.S. Cl.
CPC ...... *H04L 12/40013* (2013.01); *G06F 13/426* (2013.01); *H04L 12/2801* (2013.01); *H04L 12/40* (2013.01); *H04L 12/40123* (2013.01)

(58) Field of Classification Search
CPC ............................................... H04L 12/40013
USPC .................................................. 370/282, 466
See application file for complete search history.

(56) References Cited

U.S. PATENT DOCUMENTS

| | | | |
|---|---|---|---|
| 5,960,001 A * | 9/1999 | Shaffer | ................. H04L 12/413 370/443 |
| 6,085,269 A | 7/2000 | Chan et al. | |
| 2001/0049729 A1* | 12/2001 | Carolan | .............. H04L 12/2801 709/220 |

(Continued)

FOREIGN PATENT DOCUMENTS

| | | | |
|---|---|---|---|
| JP | 2005-184616 A | 7/2005 | |
| JP | 2008-257400 A | 10/2008 | |

(Continued)

OTHER PUBLICATIONS

European Search Report for EP 16 18 8016, dated Oct. 24, 2016.

*Primary Examiner* — Kouroush Mohebbi
(74) *Attorney, Agent, or Firm* — Arent Fox LLP; Michael Fainberg (57) ABSTRACT

The invention relates to a method for managing configuration of an industrial internet field broadband bus, the method being applicable to a two-wire data transfer network in which a bus controller and respective bus terminals are synchronized in clock, and the bus controller allocates time slices for the respective bus terminals and the bus controller, so that the bus controller firstly acquires the configuration information, and determines the bus terminal corresponding to the configuration information, and then the bus controller transmits the configuration information to the bus terminal in the time slice occupied by the bus controller, when the bus controller need transmit configuration information to the respective bus terminals, to thereby make the bus terminal perform corresponding configuration operations according to the configuration information.

16 Claims, 5 Drawing Sheets

(56) References Cited

U.S. PATENT DOCUMENTS

| | | | | |
|---|---|---|---|---|
| 2002/0159400 | A1* | 10/2002 | Park | H04L 12/413 370/282 |
| 2009/0059962 | A1* | 3/2009 | Schmidt | H04J 3/0667 370/503 |
| 2015/0289017 | A1 | 10/2015 | Liang et al. | |
| 2017/0373873 | A1* | 12/2017 | Li | H04L 12/40 |

FOREIGN PATENT DOCUMENTS

| | | |
|---|---|---|
| JP | 2014-222871 A | 11/2014 |
| WO | 02/03657 A2 | 1/2002 |

* cited by examiner

METHOD FOR MANAGING CONFIGURATION OF INDUSTRIAL INTERNET FIELD BROADBAND BUS

CROSS REFERENCE TO RELATED APPLICATIONS

This application claims priority to Chinese Patent Application No. 201610466728.2, filed with the State Intellectual Property Office of People's Republic of China on Jun. 23, 2016, the content of which is incorporated herein by reference in its entirety.

TECHNICAL FIELD

The present invention relates to the field of industry Internet bus technologies, and particularly to a method for managing configuration of an industrial internet field broadband bus.

BACKGROUND

As the Internet technologies are being developed, various buses have been widely applied to industry field automation to monitor an industry field in a real-time manner, where if there is a change manufacturing environment in the industry internet automation field, then a controlled device will be added to a control system, or a controlled device in the control system will be adjusted, and further the added or adjusted device will be configured with necessary parameters, the real-time of configuration process may influence directly the efficiency of manufacturing in the industry internet field.

In the prior art, data are transmitted over the existing Ethernet in the mode of Carrier Sense Multiple Access with Collision Detection (CSMA/CD), and if the network is heavily loaded (more than 40%), then the deterministic network may not meet a real-time requirement of industry control, so if the configuration parameters are transmitted in the CSMA/CD collision detection mode over the Ethernet in the prior art, then the configuration parameters will be poorly real-time, thus greatly degrading the efficiency of manufacturing in the industry internet field.

In summary, a solution to real-time transmission of configuration parameters is highly desirable in the industry internet field.

SUMMARY

The invention provides a method for managing configuration of an industrial internet field broadband bus so as to address the problem in the prior art of the absence of a highly desirable solution to real-time transmission of configuration parameters in the industry internet field.

An embodiment of the invention provides a method for managing configuration of an industrial internet field broadband bus, the method being applicable to a two-wire data transfer network in which a bus controller and respective bus terminals are synchronized in clock, and the bus controller allocates time slices for the respective bus terminals and the bus controller, wherein the method includes:

acquiring, by the bus controller, configuration information, and determining a bus terminal corresponding to the configuration information; and transmitting, by the bus controller, the configuration information to the bus terminal in the time slice occupied by the bus controller so that the bus terminal performs corresponding configuration operations according to the configuration information.

The method according to the embodiments of the invention is applicable to in which the bus controller and the respective bus terminals are synchronized in clock, and the bus controller allocates time slices for the respective bus terminals and the bus controller, so that the bus controller firstly acquires the configuration information, and determines the bus terminal corresponding to the configuration information, and then the bus controller transmits the configuration information to the bus terminal in the time slice occupied by the bus controller when the bus controller need transmit the configuration information to the respective bus terminals, to thereby make the bus terminal perform the corresponding configuration operations according to the configuration information. With this method, the configuration information is transmitted in the time slice as real-time information to thereby avoid the problem in the prior art of failing to transmit the configuration information in the CSMA/CD collision detection scheme, so as to ensure the configuration information to be transmitted in real time to the respective bus terminals, thus improving the efficiency of manufacturing in the industry internet field.

BRIEF DESCRIPTION OF THE DRAWINGS

In order to make the technical solutions according to the embodiments of the invention art more apparent, the drawings to which a description of the embodiments refers will be briefly introduced below, and apparently the drawings to be described below are merely illustrative of some of the embodiments of the invention, and those ordinarily skilled in the art can derive from these drawings other drawings without any inventive effort. In the drawings.

DETAILED DESCRIPTION OF THE EMBODIMENTS

In order to make the objects, technical solutions, and advantages of the embodiments of the invention more apparent, the technical solutions according to the embodiments of the invention will be described below clearly and fully with reference to the drawings in the embodiments of the invention, and apparently the embodiments described below are only a part but not all of the embodiments of the invention. Based upon the embodiments here of the invention, all the other embodiments which can occur to those skilled in the art without any inventive effort shall fall into the scope of the invention.

Figure 1A:
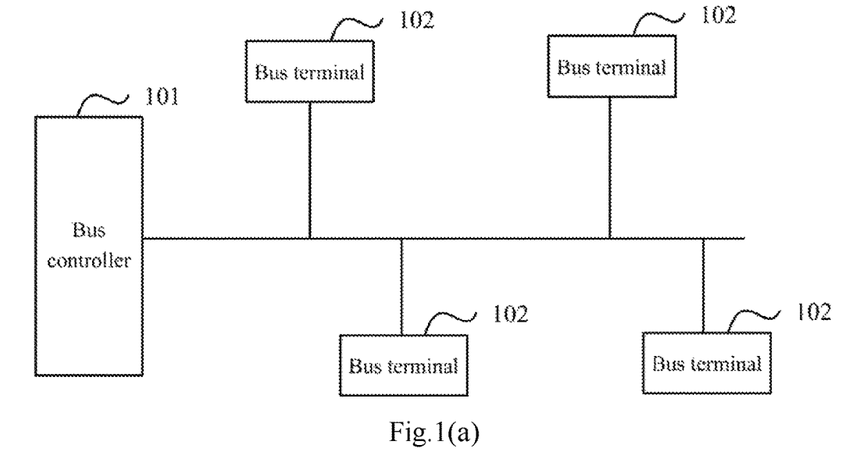
FIG. 1(a) is a first schematic architectural diagram of a two-wire data transfer network to which an embodiment of the invention is applicable.

As illustrated in FIG. 1(a) which is a first schematic architectural diagram of a two-wire data transfer network to which an embodiment of the invention is applicable, the network includes a bus controller 101 and at least one bus terminal 102, where the bus controller 101 and the respective bus terminals 102 are connected over the two-wire data transfer network, the bus controller 101 and the respective bus terminals 102 in the two-wire data transfer network are synchronized in clock, and the bus controller 101 allocates time slices for the respective bus terminals 102 and the bus controller 101.

Here a clock synchronization protocol can be a Picture Transfer Protocol (PTP), a Network Time Protocol (NTP), a Simple Network Time Protocol (SNTP), or any one of other applicable clock synchronization protocols in which a reference clock is created, the bus controller and the respective bus terminals are synchronized separately, and a synchronization interval of time is preset to control periodical synchronization; and the bus controller 101 scans the bus terminals based upon the reference clock, updates the number of bus terminals at any time, and updates bus time slices according to the largest number of terminals over a bus.

The embodiments of the invention will be described below in further details with reference to the drawings.

Figure 2:
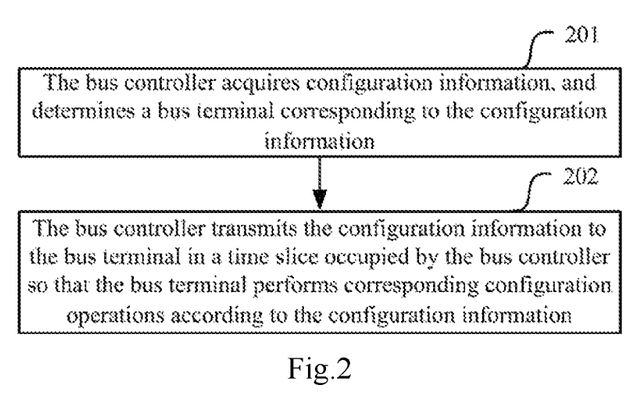
FIG. 2 is a flow chart of a method for managing configuration of an industrial internet field broadband bus according to an embodiment of the invention.

As illustrated in FIG. 2, a method for managing configuration of an industrial internet field broadband bus according to an embodiment of the invention applicable to the system architecture as illustrated in FIG. 1(a) includes:

In the step 201, the bus controller acquires configuration information, and determines a bus terminal corresponding to the configuration information; and In the step 202, the bus controller transmits the configuration information to the bus terminal in a time slice occupied by the bus controller so that the bus terminal performs corresponding configuration operations according to the configuration information.

Optionally before the step 201, the bus controller allocates time slices for the bus controller and the respective bus terminals, so that the bus controller and the respective bus terminals can only transmit the data after their respective time slices arrive when the bus controller and the respective bus terminals need transmit real-time data; and in an embodiment of the invention, the configuration information is transmitted as real-time data, so the bus controller can only transmit the configuration information in its time slice when the bus controller need transmit the configuration information.

In the step 201 above, the configuration information acquired by the bus controller can be pre-stored, and optionally the two-wire data transfer network further includes a bus configuration and monitoring unit connected with the bus controller, which is configured, before the bus controller acquires the configuration information, to receive the configuration information input by a user, and to transmit the configuration information to the bus controller so that the bus controller stores the configuration information.

Figure 1B:
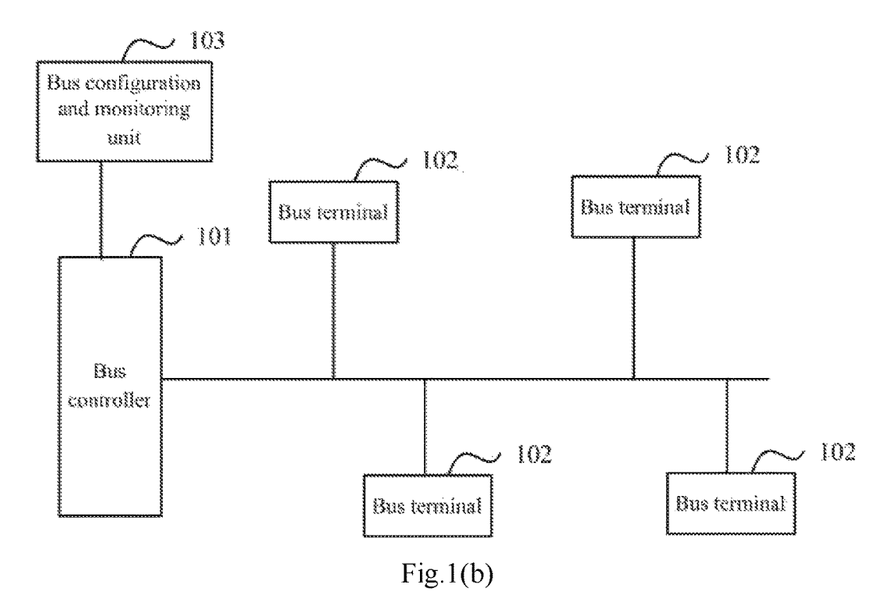
FIG. 1(b) is a second schematic architectural diagram of a two-wire data transfer network to which an embodiment of the invention is applicable.

Particularly referring to FIG. 1(b) which is a second schematic architectural diagram of a two-wire data transfer network to which an embodiment of the invention is applicable, the network further includes a bus configuration and monitoring unit 103 configured to receive the configuration information input by a user, and to transmit the configuration information to the bus controller 101 so that the bus controller stores the configuration information input by the user, so that in the step 201 above, the bus controller 101 can acquire the pre-stored configuration information, and determine the bus terminal corresponding to the configuration information after acquiring the configuration information; and optionally the bus controller determines the bus terminal corresponding to the configuration information in such a way that the bus controller determines a type identifier corresponding to the configuration information according to a preset correspondence relationship between the configuration information and the type identifier, where the type identifier identifies a device type of a bus terminal; and the bus controller determines the bus terminal corresponding to the determined type identifier as the bus terminal corresponding to the configuration information.

Moreover the bus configuration and monitoring unit 103 can be further configured to configure collectively parameters of respective components in the bus system, and to monitor in a real-time manner operating states of the respective components, through the bus controller 101, where the bus configuration and monitoring unit 103 can communicate with the bus controller 101 in an existing data format, e.g., RS485 Bus, etc., and if there are a large amount of configuration data to be transmitted, then they will be transmitted using orthogonal frequency multiple access and baseband transmission in an embodiment of the invention, where configuration information or a monitoring instruction for at least one bus terminal 102 over the two-wire data transfer network is transmitted to the bus controller 101 so that the bus controller 101 transmits the configuration information to the corresponding bus terminal 102; and operating state information generated by at least one bus terminal 102 over the two-wire data transfer network transmitted by the bus controller is received.

Figure 1C:
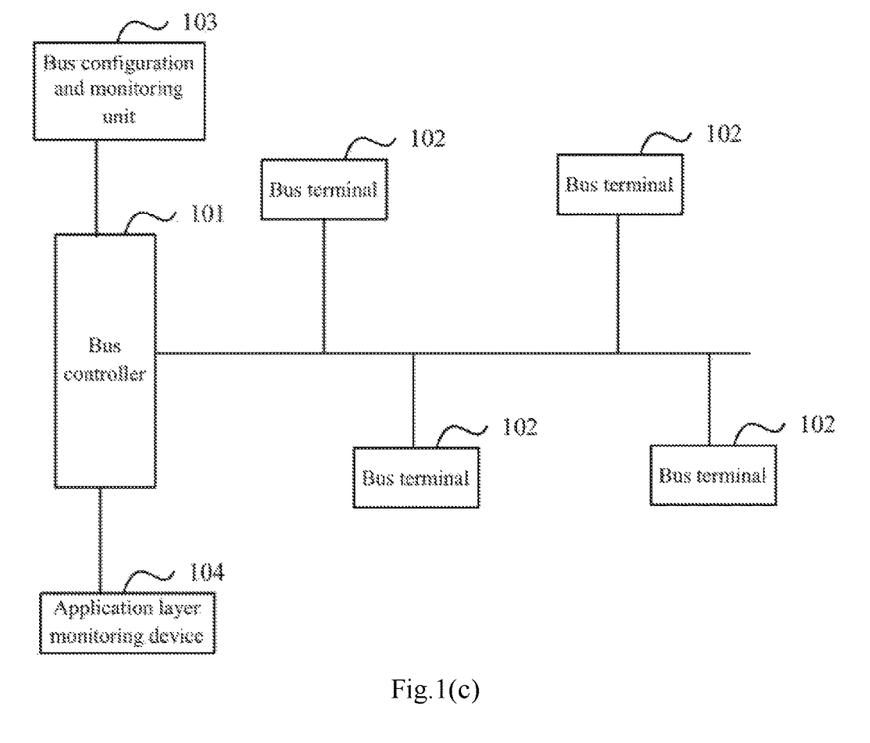
FIG. 1(c) is a third schematic architectural diagram of a two-wire data transfer network to which an embodiment of the invention is applicable.

In a practical application, optionally as illustrated in FIG. 1(c) which is a third schematic architecture diagram of a two-wire data transfer network to which an embodiment of the invention is applicable, the network further includes an application layer monitoring device 104 connected with the bus controller 101, which is configured to acquire data of the bus controller 101 and the respective bus terminals 102, and control in a real-time manner the bus controller 101 and the respective bus terminals 102.

Here in an embodiment, the respective bus terminals in the two-wire data transfer network include a part or all of: a pressure sensor, a temperature sensor, and a flow sensor. Particularly any terminal which can be configured in industry process control will be applicable to the embodiment of the invention.

Here in an embodiment, the preset correspondence relationship between the configuration information and the type identifier can be as depicted in Table 1, and of course, Table 1 is merely intended to illustrate but not to limit the embodiment of the invention.

TABLE 1

| Configuration information | Type identifier | Remark |
|---|---|---|
| ***** | 1-1 | Pressure sensor 1 |
| ***** | 1-2 | Pressure sensor 2 |
| ***** | 2 | Temperature sensor |

Of course, in a particular implementation, the configuration information can carry the type identifier, so the correspondence relationship between the configuration information and the type identifier can be included in the configuration information, which will also be applicable to the embodiment of the invention.

In the step 202 above, the bus controller transmits the configuration information to the corresponding bus terminal in the time slice occupied by the bus controller so that the bus terminal performs the corresponding configuration operations according to the configuration information. Optionally the bus controller transmits the configuration information to the bus terminal in the time slice occupied by the bus controller using TTE or TDMA. Optionally the bus controller transmits the configuration information to the bus terminal in the time slice occupied by the bus controller particularly in the following steps:

In the step A, the bus controller searches a preset three-dimension correspondence relationship for an Internet Protocol (IP) address and a Media Access Control (MAC) address corresponding to the determined type identifier; and In the step B, the bus controller generates a message carrying the configuration information, and transmits the message to the bus terminal in the time slice occupied by the bus controller, where the message includes a destination MAC address which is the found MAC address, and a destination IP address which is the found IP address.

Here the three-dimension correspondence relationship refers to a three-dimension correspondence relationship between the type identifier, the MAC address, and the IP addresses.

Thus in the embodiments of the invention, the specific bus terminal to which the configuration shall be transmitted can be determined according to the configuration information, and the three-dimension correspondence relationship, to thereby identify the bus terminal based upon the IP address.

For the sake of convenient understanding, the embodiments of the invention will be further described below particularly as follows:

Herein an embodiment, the three-dimension correspondence relationship can be created manually, for example, the three-dimension correspondence relationship is created after each bus terminal is configured manually with an IP address.

Here in an embodiment, in order to improve the efficiency of allocating the IP address as compared with manual allocation of the IP address, and to create automatically the three-dimension correspondence relationship, optionally the three-dimension correspondence relationship can be generated in an embodiment of the invention in the following steps A1 and A2:

In the step A1, the bus controller receives an IP address obtainment request carrying an MAC address and a type identifier of the bus terminal transmitted by the bus terminal;

Here in an embodiment, the bus controller receives the IP address obtainment request transmitted by the bus terminal in the step A1 particularly in such a way that the bus controller receives the IP address obtainment request transmitted by the bus terminal in the dynamic host configuration protocol; and In the step A2, the bus controller allocates an IP address for the bus terminal, and creates the three-dimension correspondence relationship between the type identifier, the MAC address, and the allocated IP address.

Here in an embodiment, the bus controller allocates the IP address for the bus controller in the step A2 particularly in such a way that the bus controller allocates the IP address for the bus controller in the dynamic host configuration protocol.

The method according to the embodiments of the invention is applicable to the two-wire data transfer network in which the bus controller and the respective bus terminals are synchronized in clock, and the bus controller allocates time slices for the respective bus terminals and the bus controller, so that the bus controller firstly acquires the configuration information, and determines the bus terminal corresponding to the configuration information, and then the bus controller transmits the configuration information to the bus terminal in the time slice occupied by the bus controller, when the bus controller need transmit the configuration information to the respective bus terminals, to thereby make the bus terminal perform the corresponding configuration operations according to the configuration information. With this method, the configuration information is transmitted in the time slice as real-time information to thereby avoid the problem in the prior art of failing to transmit the configuration information in the CSMA/CD collision detection scheme, so as to ensure the configuration information to be transmitted in real time to the respective bus terminals, thus improving the efficiency of manufacturing in the industry internet field.

Figure 3:
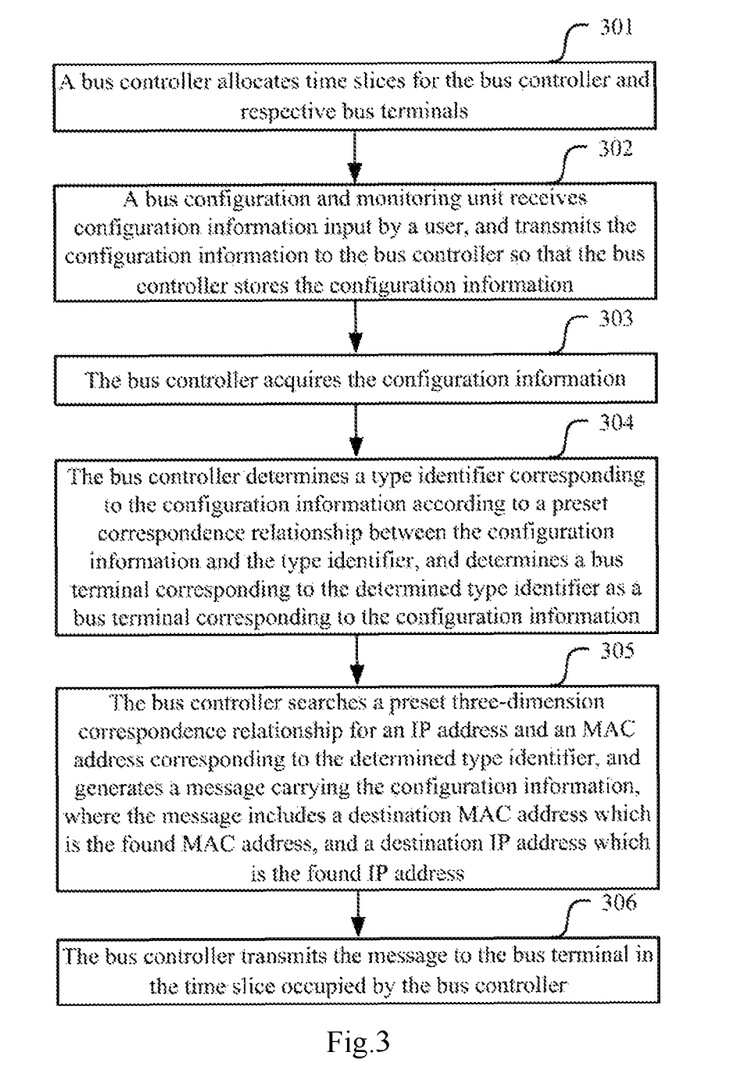
FIG. 3 is a detailed flow chart of a method for managing configuration of an industrial internet field broadband bus according to an embodiment of the invention.

A method for managing configuration of an industrial internet field broadband bus according to an embodiment of the invention will be described below in details, and as illustrated in FIG. 3, the method includes the following steps:

In the step 301, a bus controller allocates time slices for the bus controller and respective bus terminals;

In the step 302, a bus configuration and monitoring unit receives configuration information input by a user, and transmits the configuration information to the bus controller so that the bus controller stores the configuration information;

In the step 303, the bus controller acquires the configuration information;

In the step 304, the bus controller determines a type identifier corresponding to the configuration information according to a preset correspondence relationship between the configuration information and the type identifier, and determines a bus terminal corresponding to the determined type identifier as a bus terminal corresponding to the configuration information;

In the step 305, the bus controller searches a preset three-dimension correspondence relationship for an IP address and an MAC address corresponding to the determined type identifier, and generates a message carrying the configuration information, where the message includes a destination MAC address which is the found MAC address, and a destination IP address which is the found IP address; and In the step 306, the bus controller transmits the message to the bus terminal in the time slice occupied by the bus controller.

The method according to the embodiments of the invention is applicable to the two-wire data transfer network in which the bus controller and the respective bus terminals are synchronized in clock, and the bus controller allocates time slices for the respective bus terminals and the bus controller, so that the bus controller firstly acquires the configuration information, and determines the bus terminal corresponding to the configuration information, and then the bus controller transmits the configuration information to the bus terminal in the time slice occupied by the bus controller, when the bus controller need transmit the configuration information to the respective bus terminals, to thereby make the bus terminal perform the corresponding configuration operations according to the configuration information. With this method, the configuration is transmitted in the time slice as real-time information to thereby avoid the problem in the prior art of failing to transmit the configuration information in the CSMA/CD collision detection scheme, so as to ensure the configuration information to be transmitted in real time to the respective bus terminals, thus improving the efficiency of manufacturing in the industry internet field.

Figure 4:
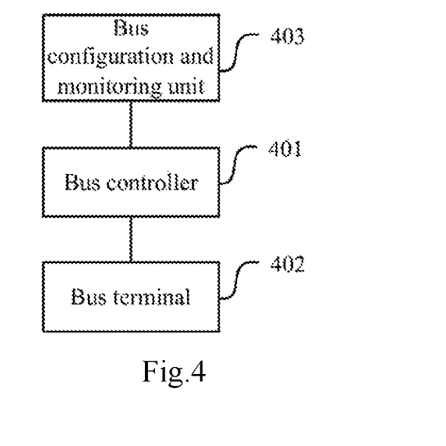
FIG. 4 is a schematic diagram of a system for managing configuration of an industrial internet field broadband bus according to an embodiment of the invention.

Based upon the same technical concept, as illustrated in FIG. 4, an embodiment of the invention further provides a system for managing configuration of an industrial internet field broadband bus, the system being applicable to a two-wire data transfer network in which a bus controller 401 and respective bus terminals 402 are synchronized in clock, and the bus controller 401 allocates time slices for the respective bus terminals 402 and the bus controller, where:

The bus controller 401 acquires configuration information, and determines a bus terminal 402 corresponding to the configuration information; and The bus controller 401 transmits the configuration information to the bus terminal 402 in the time slice occupied by the bus controller so that the bus terminal 402 performs corresponding configuration operations according to the configuration information.

Optionally the two-wire data transfer network further includes a bus configuration and monitoring unit 403 connected with the bus controller 401, which is configured to receive the configuration information input by a user, and to transmit the configuration information to the bus controller 401 so that the bus controller 401 stores the configuration information.

Optionally the bus controller 401 is configured to determine a type identifier corresponding to the configuration information according to a preset correspondence relationship between the configuration information and the type identifier, where the type identifier identifies a device type of a bus terminal 402; and to determine the bus terminal 402 corresponding to the determined type identifier as the bus terminal 402 corresponding to the configuration information.

Optionally the bus controller 401 is configured to search a preset three-dimension correspondence relationship for an IP address and an MAC address corresponding to the determined type identifier; and to generate a message carrying the configuration information, where the message includes a destination MAC address which is the found MAC address, and a destination IP address which is the found IP address, and to transmit the message to the bus terminal 402 in the time slice occupied by the bus controller.

Optionally the bus controller 401 further configured to create the three-dimension correspondence relationship is configured:

To receive an IP address obtainment request carrying an MAC address and a type identifier of the bus terminal 402 transmitted by the bus terminal 402; and To allocate an IP address for the bus terminal 402, and to create the three-dimension correspondence relationship between the type identifier, the MAC address, and the allocated IP address.

Optionally the bus controller 401 is configured to receive the IP address obtainment request transmitted by the bus terminal 402 in the dynamic host configuration protocol; and to allocate the IP address for the bus terminal 402 in the dynamic host configuration protocol.

Optionally the bus controller 401 is configured to transmit the configuration information to the bus terminal 402 in the time slice occupied by the bus controller using TTE or TDMA.

Optionally the bus controller 401 is configured to allocate the time slices for the bus controller and the respective bus terminals 402 before the configuration information is acquired.

Optionally the bus controller and the bus terminals are synchronized in clock in any one of PTP, NTP and SNTP.

Optionally the respective bus terminals 402 in the two-wire data transfer network include a part or all of a pressure sensor, a temperature sensor, and a flow sensor.

The system according to the embodiments of the invention is applicable to the two-wire data transfer network in which the bus controller and the respective bus terminals are synchronized in clock, and the bus controller allocates time slices for the respective bus terminals and the bus controller, so that the bus controller firstly acquires the configuration information, and determines the bus terminal corresponding to the configuration information, and then the bus controller transmits the configuration information to the bus terminal in the time slice occupied by the bus controller, when the bus controller need transmit the configuration information to the respective bus terminals, to thereby make the bus terminal perform the corresponding configuration operations according to the configuration information. With this system, the configuration is transmitted in the time slice as real-time information to thereby avoid the problem in the prior art of failing to transmit the configuration information in the CSMA/CD collision detection scheme, so as to ensure the configuration information to be transmitted in real time to the respective bus terminals, thus improving the efficiency of manufacturing in the industry internet field.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for managing configuration of an industrial internet field broadband bus, the method being applicable to a two-wire data transfer network in which a bus controller and respective bus terminals are synchronized in clock, all bus terminals are linked to the bus controller through a two-wire line, and the bus controller allocates time slices for the respective bus terminals and the bus controller, wherein the method comprises:
   allocating, by the bus controller, time slices for the bus controller and the respective bus terminals;
   acquiring, by the bus controller, configuration information, and determining a bus terminal corresponding to the configuration information; and
   transmitting, by the bus controller, the configuration information to the bus terminal in the time slice occupied by the bus controller so that the bus terminal performs corresponding configuration operations according to the configuration information;
   wherein determining, by the bus controller, the bus terminal corresponding to the configuration information comprises:
   determining, by the bus controller, a type identifier corresponding to the configuration information according to a preset correspondence relationship between the configuration information and the type identifier, wherein the type identifier identifies a device type of a bus terminal; and
   determining, by the bus controller, the bus terminal corresponding to the determined type identifier as the bus terminal corresponding to the configuration information;
   wherein transmitting, by the bus controller, the configuration information to the bus terminal in the time slice occupied by the bus controller comprises:
   searching, by the bus controller, a preset three-dimension correspondence relationship for an IP address and an MAC address corresponding to the determined type identifier; and
   generating, by the bus controller, a message carrying the configuration information, wherein the message comprises a destination MAC address which is the found MAC address, and a destination IP address which is the found IP address, and transmitting the message to the bus terminal in the time slice occupied by the bus controller;
   wherein the preset three-dimension correspondence relationship is created by the bus controller through:
   receiving, by the bus controller, an IP address obtainment request carrying an MAC address and a type identifier of the bus terminal transmitted by the bus terminal; and
   allocating, by the bus controller, an IP address for the bus terminal, and creating the three-dimension correspondence relationship between the type identifier, the MAC address, and the allocated IP address.

2. The method according to claim 1, wherein the two-wire data transfer network further comprises a bus configuration and monitoring unit connected with the bus controller; and
   before the bus controller acquires the configuration information, the method further comprises:
   receiving, by the bus configuration and monitoring unit, the configuration information input by a user, and transmitting the configuration information to the bus controller so that the bus controller stores the configuration information.

3. The method according to claim 2, wherein the bus controller and the bus terminals are synchronized in clock in any one of Precision Time Protocol, PTP, Network Time Protocol, NTP, and Simple Network Time Protocol, SNTP.

4. The method according to claim 2, wherein the respective bus terminals in the two-wire data transfer network comprise a part or all of a pressure sensor, a temperature sensor, and a flow sensor.

5. The method according to claim 1, wherein receiving, by the bus controller, the IP address obtainment request transmitted by the bus terminal comprises:
   receiving, by the bus controller, the IP address obtainment request transmitted by the bus terminal in the dynamic host configuration protocol; and
   allocating, by the bus controller, the IP address for the bus terminal comprises:
   allocating the IP address for the bus terminal in the dynamic host configuration protocol.

6. The method according to claim 5, wherein the bus controller and the bus terminals are synchronized in clock in any one of Precision Time Protocol, PTP, Network Time Protocol, NTP, and Simple Network Time Protocol, SNTP.

7. The method according to claim 5, wherein the respective bus terminals in the two-wire data transfer network comprise a part or all of a pressure sensor, a temperature sensor, and a flow sensor.

8. The method according to claim 1, wherein transmitting, by the bus controller, the configuration information to the bus terminal in the time slice occupied by the bus controller comprises:
   transmitting, by the bus controller, the configuration information to the bus terminal in the time slice occupied by the bus controller using Time-Trigger Ethernet, TTE, or Time Division Multiple Access, TDMA.

9. The method according to claim 1, wherein before the bus controller acquires the configuration information, the method further comprises:
   allocating the time slices for the bus controller and the respective bus terminals.

10. The method according to claim 1, wherein the bus controller and the bus terminals are synchronized in clock in any one of Precision Time Protocol, PTP, Network Time Protocol, NTP, and Simple Network Time Protocol, SNTP.

11. The method according to claim 1, wherein the bus controller and the bus terminals are synchronized in clock in any one of Precision Time Protocol, PTP, Network Time Protocol, NTP, and Simple Network Time Protocol, SNTP.

12. The method according to claim 1, wherein the bus controller and the bus terminals are synchronized in clock in any one of Precision Time Protocol, PTP, Network Time Protocol, NTP, and Simple Network Time Protocol, SNTP.

13. The method according to claim 1, wherein the respective bus terminals in the two-wire data transfer network comprise a part or all of a pressure sensor, a temperature sensor, and a flow sensor.

14. The method according to claim 1, wherein the respective bus terminals in the two-wire data transfer network comprise a part or all of a pressure sensor, a temperature sensor, and a flow sensor.

15. The method according to claim 1, wherein the respective bus terminals in the two-wire data transfer network comprise a part or all of a pressure sensor, a temperature sensor, and a flow sensor.

16. The method according to claim 1, wherein the respective bus terminals in the two-wire data transfer network comprise a part or all of a pressure sensor, a temperature sensor, and a flow sensor.

* * * * *